United States Patent Office 3,043,519
Patented July 10, 1962

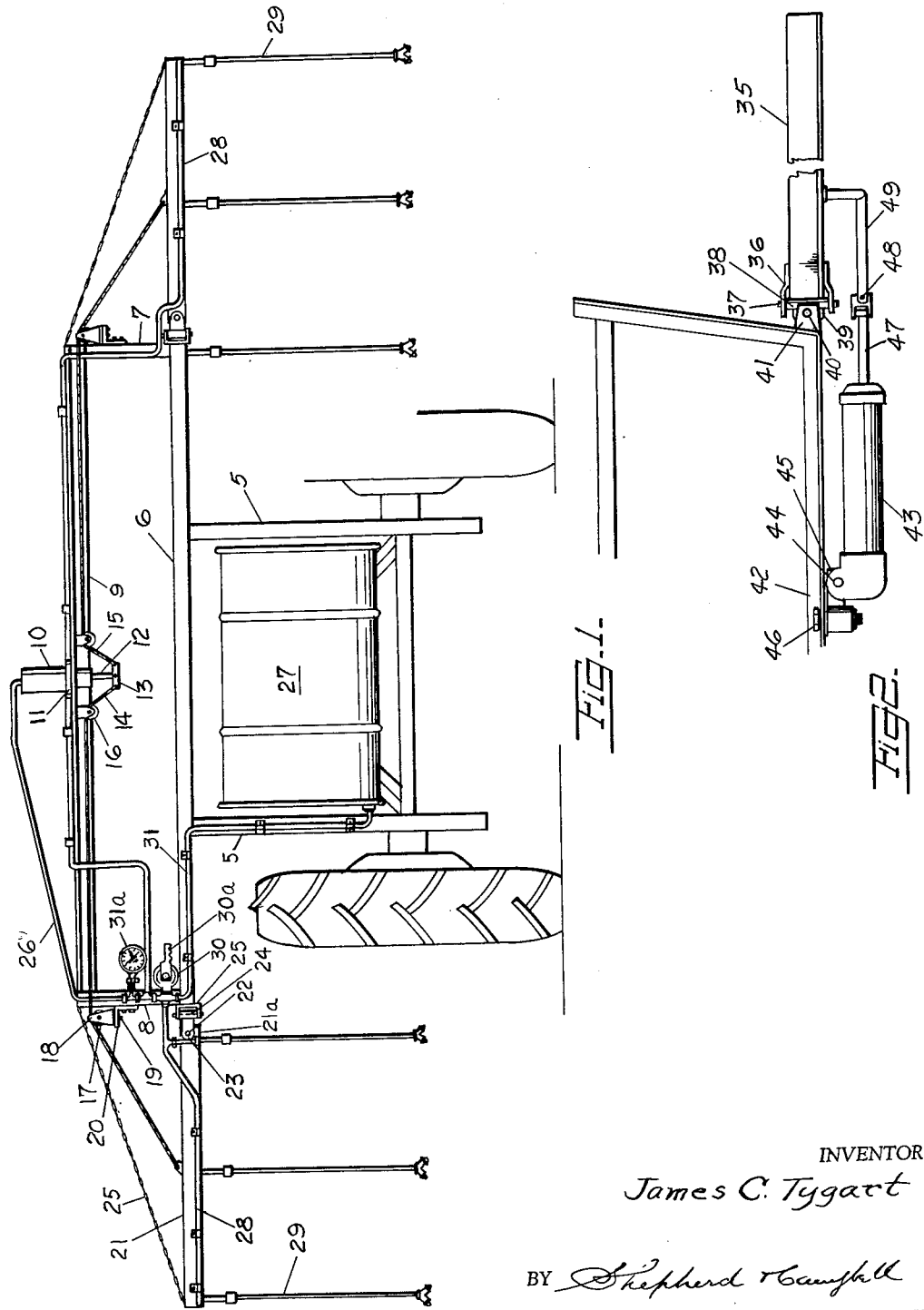

3,043,519
BI-SWING SPRAY BOOMS AND MEANS FOR HYDRAULICALLY ACTUATING THE SAME
James C. Tygart, 705 S. Henritta St., Nashville, Ga.
Filed Apr. 15, 1960, Ser. No. 22,548
2 Claims. (Cl. 239—167)

This invention relates to a hydraulically actuated, yieldable spray boom for spraying mechanisms of the type commonly used in agriculture. Machines of the character indicated are widely used in the discharge of insecticides, liquid fertilizer and the like upon crops, trees or other vegatation. They comprise, as a rule, some form of traveling vehicle such as a tractor or a spraying machine towed by a tractor. The spray booms project in opposite directions from the spraying machine and across the line of travel of the traveling vehicle by which the booms are carried and said booms support the hose lines and spray heads from which the liquid to be sprayed, is discharged upon the vegetation. Spray booms as now commonly employed are hinged to be swung upwardly in a vertical path so that they stand upright, while the spraying machine is traveling to the place of the spraying operations.

The primary object of the present invention is to provide spray booms of the character described, with mountings which will permit said booms to be not only swung upwardly, but to yield horizontally in such manner that when such a boom encounters obstructions such as tree limbs or small trees, fence posts, etc., it will yield to permit the spray machine to pass such obstruction without damage to the boom or the spray heads supported therefrom.

It is also an object of the invention to provide hydraulic operating means for lifting the booms, while permitting the horizontal swing of the booms.

Many ways will suggest themselves to those skilled in the art for providing the bi-swing movement and the hydraulic actuation. Two ways have been illustrated in the accompanying drawing but it is to be understood that other ways may be provided and that the invention is not limited to the ways shown.

In the drawing:

FIG. 1 is a rear elevation of one form of the invention and

FIG. 2 is a rear view of another form.

FIG. 1 illustrates a supporting frame adapted to be secured to and to extend across the rear of a spraying machine. Any suitable frame may be used but the one illustrated comprises the two upright members 5 which are attached at their upper ends to a lower horizontal member 6. Short uprights 7 and 8 support an upper horizontal member 9 from member 6. These frame members are preferably of angle iron form, though other shapes may be employed.

A vertically disposed hydraulic cylinder 10 is secured through flange 11 to upper frame member 9. The plunger or piston rod 12 projects downwardly from cylinder 10 and is pivoted at its lower end to a rocking or toggle lever 13. This toggle insures that the pull upon cables 14 and 15 will be equalized when the plunger moves downwardly. The ends of these cables are attached to the lever 13 adjacent its opposite ends and they pass first over pulleys 16 and then over pulleys 17. Pulleys 17 are supported on the short uprights 7 and 8. Pulleys 17 may be mounted in housings 18 which housings are pivoted by stems 19 in brackets 20 on the uprights.

The outer ends of the cables 14 and 15 are attached to the spray booms 21. Universal joint connections between the uprights 7 and 8 and the booms permit the booms to swing vertically under the pull of the cables, or to swing horizontally in clearing an obstruction. These universal connections comprise inner end portions 21ª which are mounted upon horizontal pivots 22, said pivots being carried by ears 23. Ears 23, in turn are pivoted by vertical pivots 24 in the brackets 25, the latter being secured to the short uprights 7 and 8. Thus the booms may swing vertically on pivots 22 and they may swing horizontally on vertical pivots 24. Chains 25 or like flexible strands extend from the upper portions of the uprights 7 and 8 to the outer ends of the booms and limit the downward swing of the booms to an approximately horizontal position.

A fluid supply line 26 leads to the upper portion of the hydraulic cylinder 10 and when pressure fluid is admitted to the upper portion of said cylinder the plunger or piston moves downwardly, thereby imparting an equalized pull upon the cables to swing the spray booms vertically upward.

The invention is not limited to any particular source of pressure fluid supply. Most agricultural tractors have hydraulic systems for actuating various appliances handled by said tractors and I may use the fluid supply from such conventional hydraulic systems. Also spraying machines are usually provided with pumps for keeping the supply of spray material under pressure, whether this material be liquid fertilizer, insecticides, or otherwise. I may use such pressure material in cylinder 10 to actuate the booms.

In FIG. 1 I have illustrated a drum 27 for containing the material to be sprayed. Hose lines 28 extend along the booms and deliver the material to be sprayed to conventional spray arms and heads 29. A conventional multiple way valve 30 may be disposed in the supply line 31 leading from drum 27 to valve 30. The hose lines 28 receive their supply through valve 30. When the operating handle 30ª of the valve is turned to one position fluid pressure is delivered to cylinder 10 to elevate the booms and simultaneously cut off the pressure supply to hoses 28 and the spray nozzles. When the handle 30ª is turned to another position pressure is cut off from cylinder 10, the booms move downwardly to spraying position and fluid pressure is delivered to the hoses 28 and the spray arms and heads. By proper manipulation of the valve handle the pressure may be cut off from the cylinder at any point in the travel of its plunger and the booms may thereby be held in any desired position of elevation. A gauge may be provided at 31ª.

Conventional pressure relief valves may be employed to limit the pressure delivered to either cylinder 10 or the hoses. However these form no part of the invention, are commonly used expedients in spraying machines and are not shown.

In the form of the device shown in FIG. 2, a spray boom 35 has ears 36 secured thereto, at its heel portion, which ears pivotally engage a vertical pivot pin 37 which passes through a sleeve 38. A wing 39 extending from said sleeve engages a horizontal pivot 40. Pivot 40 is carried by a bracket 41 that is fixed to the frame 42 of a spray machine.

A hydraulic cylinder 43 is pivoted to swing upon a horizontal pivot 44. Pivot 44 is carried by a member 45 that is mounted to swing about a vertical pivot bolt 46, the latter being carried by frame 42.

A piston rod 47 of the hydraulic cylinder 43 is pivotally connected at 48 to the end of an arm 49 of an L-shaped bracket which depends from the underside of the boom. The admission of pressure fluid to the outer end of the cylinder, thrusts the piston rod 47 outwardly and thrusts the boom upwardly.

Having described my invention, what I claim is:

1. In apparatus of the character described the combination with a traveling wheeled vehicle, of a supporting frame carried thereby, a pair of spray booms, one projecting outwardly from each side of the frame, horizontal pivots supported from the said frame upon which the spray booms are pivoted to swing vertically, a pair of cables the outer ends of which are connected to the booms outwardly of the horizontal pivots, a single vertically disposed hydraulic cylinder and piston rod, a rocking lever pivoted substantially centrally of its length to the end of the piston rod, the inner ends of said cables being connected respectively to the outer ends of said rocking lever to thereby equalize the pull through said cables upon the said two spray booms, a source of pressure fluid, manually operable means for controlling the flow of pressure fluid to the cylinder, spraying pipes and spray heads supported by the spray booms, pipes for conducting pressure fluid from the source of fluid supply to the spray pipes and spray heads, and wherein the means for controlling the flow of pressure fluid to the cylinder also includes means for controlling the flow of pressure fluid to the spray pipes and spray heads, said controlling means being arranged to interrupt the supply of pressure fluid to the spray pipes when the pressure fluid is being delivered to the cylinder to elevate the booms, and to supply pressure fluid to the spray pipes and heads when the pressure fluid supply to the cylinder is interrupted and the booms descend to horizontal and spraying position.

2. In apparatus of the character described the combination with a traveling wheeled vehicle, of a supporting frame carried thereby, a pair of spray booms, one projecting outwardly from each side of the frame, horizontal pivots supported from the said frame upon which the spray booms are pivoted to swing vertically, a pair of cables the outer ends of which are connected to the booms outwardly of the horizontal pivots, a hydraulic cylinder, and piston rod connections between the piston rod and the two cables through which movement of the piston rod imparts an equal pull upon the said two cables, a source of pressure fluid, manually operable means for controlling the flow of pressure fluid to the hydraulic cylinder, spraying pipes and spray heads supported by the spray booms, pipes for conducting pressure fluid from the source of fluid supply to the spray pipes and spray heads, and wherein the means for controlling the flow of pressure fluid to the cylinder also includes means for controlling the flow of pressure fluid to the spray pipes and spray heads, said controlling means being arranged to interrupt the supply of pressure fluid to the spray pipes when the pressure fluid is being delivered to the cylinder to elevate the booms, and to supply pressure fluid to the spray pipes and heads when the pressure fluid supply to the cylinder is interrupted and the booms descend to horizontal and spraying position.

References Cited in the file of this patent
UNITED STATES PATENTS

| | | |
|---|---|---|
| 2,221,433 | Pitner | Nov. 12, 1940 |
| 2,628,128 | Rhodeen | Feb. 10, 1953 |

FOREIGN PATENTS

| | | |
|---|---|---|
| 154,283 | Australia | Nov. 23, 1953 |